US011630377B2

(12) United States Patent
Rivas et al.

(10) Patent No.: US 11,630,377 B2
(45) Date of Patent: Apr. 18, 2023

(54) LENS ASSEMBLY

(71) Applicant: ZF FRIEDRICHSHAFEN AG, Friedrichshafen (DE)

(72) Inventors: Anthony Louis Rivas, Royal Oak, MI (US); Thomas E. Blake, III, Novi, MI (US); Michael A. Hart, Dexter, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 304 days.

(21) Appl. No.: 16/990,039

(22) Filed: Aug. 11, 2020

(65) Prior Publication Data

US 2022/0050361 A1 Feb. 17, 2022

(51) Int. Cl.
*G03B 17/55* (2021.01)
*B60R 1/00* (2022.01)
*G02B 7/02* (2021.01)

(52) U.S. Cl.
CPC ............... *G03B 17/55* (2013.01); *B60R 1/00* (2013.01); *G02B 7/028* (2013.01)

(58) Field of Classification Search
CPC ............................... G03B 17/55; G02B 7/028
See application file for complete search history.

(56) References Cited

U.S. PATENT DOCUMENTS

| | | | |
|---|---|---|---|
| 2018/0176431 A1* | 6/2018 | Kim | H05B 3/84 |
| 2019/0137723 A1* | 5/2019 | Bernal | H04N 5/2254 |
| 2019/0381939 A1* | 12/2019 | Rafalowski | H04N 5/2254 |
| 2021/0103120 A1* | 4/2021 | Lee | G02B 7/028 |
| 2021/0294066 A1* | 9/2021 | Hirata | G03B 17/02 |
| 2021/0302807 A1* | 9/2021 | Hein | G02B 27/0006 |
| 2022/0229263 A1* | 7/2022 | Hwang | G02B 7/021 |

\* cited by examiner

*Primary Examiner* — Clayton E. LaBalle
*Assistant Examiner* — Diana Hancock
(74) *Attorney, Agent, or Firm* — Tarolli, Sundheim, Covell & Tummino LLP (57) ABSTRACT

A lens assembly includes a lens having an inner surface and an outer surface. A lens barrel supports the lens and has outer and inner lens barrel ends separated by a longitudinal axis. The lens is arranged along the longitudinal axis to span the outer lens barrel end such that the inner surface of the lens is within the lens barrel and the outer surface of the lens is outside the lens barrel. A heater element is located within the lens barrel. The heater element has a heater element electrical lead extending radially and longitudinally therefrom to provide power to the heater element. A carrier ring extends circumferentially around at least a portion of an outside lens barrel surface adjacent the inner lens barrel end. The carrier ring includes at least one lead station radially aligned with the heater element electrical lead.

19 Claims, 6 Drawing Sheets

LENS ASSEMBLY

TECHNICAL FIELD

This disclosure relates to a lens assembly and, more particularly, to an apparatus and method of providing a lens assembly for a camera mounted external to a vehicle and having an associated heater element.

BACKGROUND

A vehicle (e.g., automobile, truck, construction equipment, farm equipment, automated factory equipment) may include a number of sensors to provide information about the vehicle and the environment inside and outside the vehicle. For example, a camera may provide information about objects around the vehicle and within a field a view of the camera provided by the lens. Cameras mounted external to the vehicle, e.g., on side mirrors, front grills, etc., can be prone to ice build-up. The ice build-up can impair (or block entirely) the camera field of view and limit availability of the camera. Heater elements can be mounted outside the camera using an external harness assembly using wire management techniques and employing techniques to limit the impact to the styling of the vehicle.

SUMMARY

In an aspect, a lens assembly is described. A lens has an inner surface and an outer surface. A lens barrel supports the lens and has outer and inner lens barrel ends separated by a longitudinal axis. The lens is arranged along the longitudinal axis to span the outer lens barrel end such that the inner surface of the lens is within the lens barrel and the outer surface of the lens is outside the lens barrel. A heater element is longitudinally adjacent the inner surface of the lens and is located within the lens barrel. The heater element has a heater element electrical lead extending radially and longitudinally therefrom to provide power to the heater element. A carrier ring extends circumferentially around at least a portion of an outside lens barrel surface adjacent the inner lens barrel end. The carrier ring includes at least one lead station radially aligned with the heater element electrical lead.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of skill in the art to which the present disclosure pertains.

The invention comprises, consists of, or consists essentially of the following features, in any combination.

Figure 1:
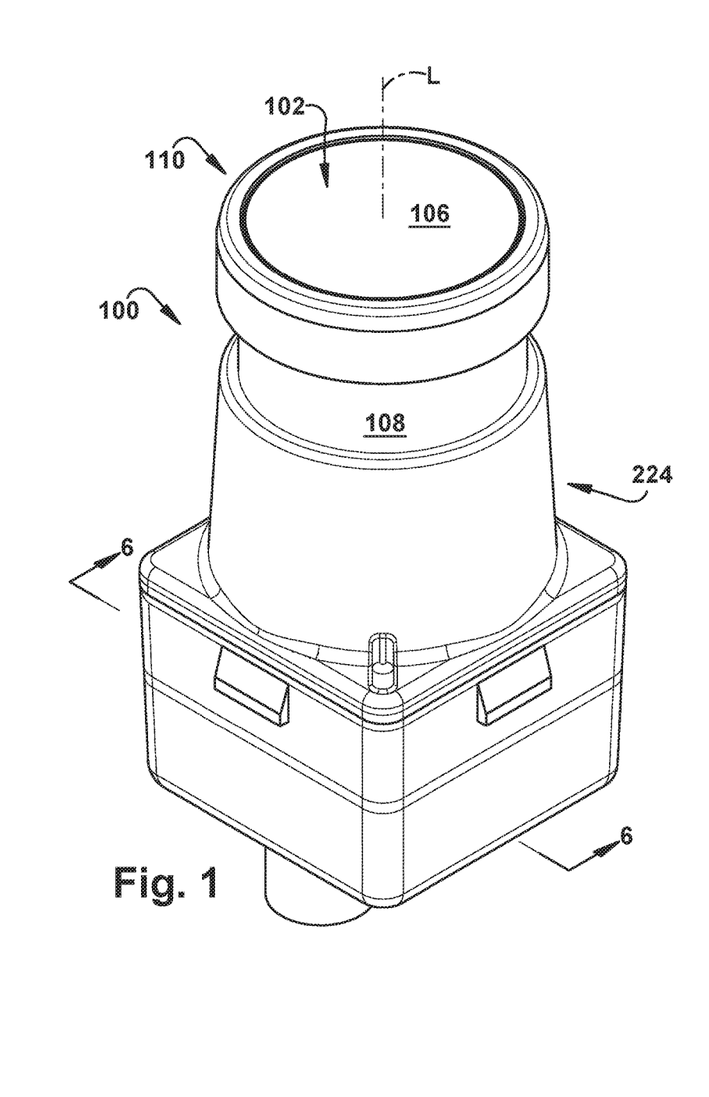
FIG. 1 is a perspective top view of an assembly including an aspect of the present invention.

FIG. 1 schematically depicts a lens assembly 100. The lens assembly 100 is similar to that disclosed in U.S. Patent Application Ser. No. 62/923,230, filed 18 Oct. 2019 and titled "Lens Assemblies with Integrated Heater Elements", which is incorporated herein by reference in its entirety.

The lens assembly 100 includes a lens 102 having an inner surface (depicted at 604 in FIG. 6) and an outer surface 106. A lens barrel 108 supports the lens 102 and has outer and inner lens barrel ends 110 and 212 (in FIG. 2), respectively, separated by a longitudinal axis L. The "longitudinal" direction, as shown herein, is substantially parallel to the longitudinal axis L and is the vertical direction, in the orientation of FIGS. 1-2. The lens 102 is arranged along the longitudinal axis L to span the outer lens barrel end 110 such that the inner surface 604 of the lens 102 is within the lens barrel 108 and the outer surface 106 of the lens 102 is outside the lens barrel 108.

A heater element (614 in FIG. 6) is longitudinally adjacent the inner surface 604 of the lens 102 and is located within the lens barrel 108. The heater element 614 may extend circumferentially about the longitudinal axis L. The term "circumferentially", as used herein, indicates a structure at least partially encircling the longitudinal axis L, in a plane perpendicular thereto, though it should be noted that the "circumferential" structure may be, but is not necessarily, coaxial with the longitudinal axis L. The heater element 614 has at least one heater element electrical lead (shown as 216 in FIG. 2) extending radially and longitudinally therefrom to provide power to the heater element 614. The heater element 614 may be helpful, for example, in clearing unwanted moisture, such as precipitation or ice, from the lens 102 during use of the lens assembly 100 with a motor vehicle.

As shown in the Figures, the lens 102 and the lens barrel 108 may be provided in a modular assembly arrangement including the heater element 614. The term "modular assembly" is used herein to indicate a situation in which the lens 102, lens barrel 108, and heater element 614 are produced as a single-piece subassembly (as shown in FIG. 2) by a supplier, and/or at a different time than the lens assembly 100 as a whole is completed as shown in FIG. 1.

A carrier ring 218 extends circumferentially around at least a portion of an outside lens barrel surface 220 adjacent the inner lens barrel end 212. The carrier ring 218 includes at least one lead station 222 radially aligned with the heater element electrical lead 216, when the lens assembly 100 is assembled as shown in the Figures. The "radial" direction, as referenced herein, indicates a direction substantially perpendicular to the longitudinal axis L, in a polar coordinate system centered upon the longitudinal axis L. Is contemplated that at least as many lead stations 222 are provided to the carrier ring 218 as there are heater element electrical leads 216 in the lens assembly 100, though one of ordinary skill in the art will readily understand that a larger number of lead stations 222 could be provided, to accommodate flexibility in the assembly process. As shown in at least FIG.

Figure 11:
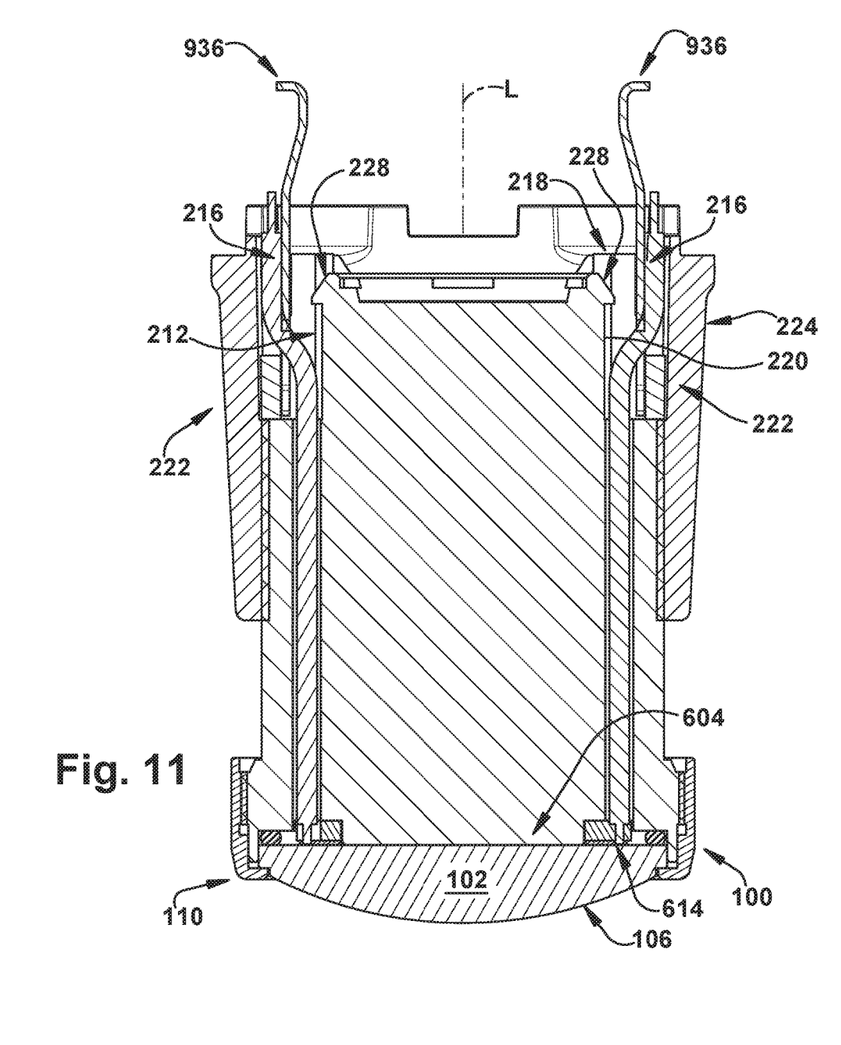
FIG. 11 is a sectional view taken along line 11-11 of FIG. 1.

11, the heater element electrical lead 216 may be at least partially interposed between the lens barrel 108 and the carrier ring 218 for reasons such as, but not limited to, facilitating manufacture of the lens assembly 100

Figure 2:
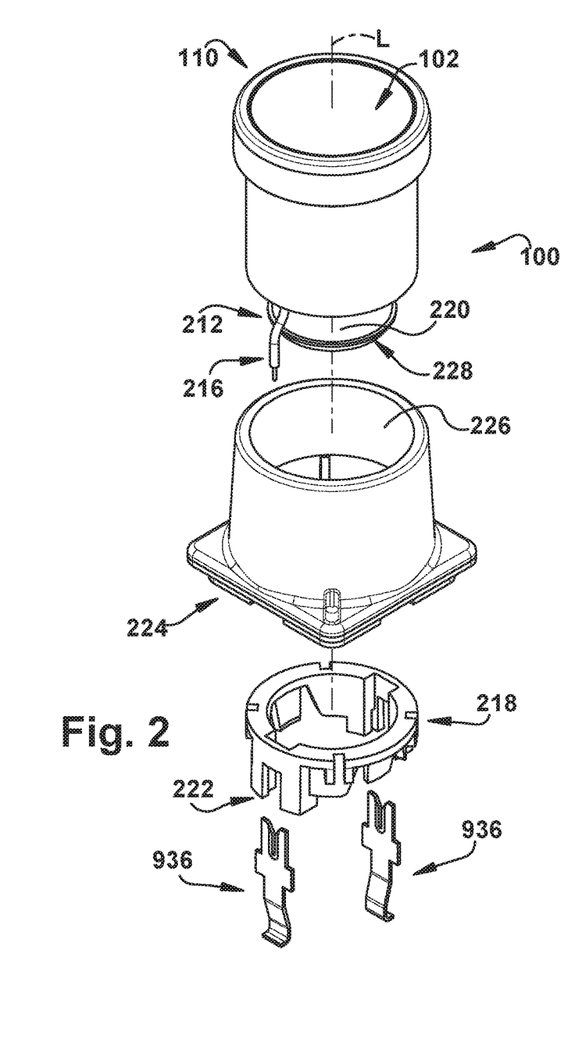
FIG. 2 is an exploded view of the assembly of FIG. 1.

With reference now to FIG. 2, the lens assembly 100 may include a base housing 224 having an internal base cavity 226. As shown in, for example, the cross-sectional view of FIG. 6, the base housing 224 may concurrently circumferentially surround at least a portion of the carrier ring 218 and at least a portion of the outside lens barrel surface 220. In some use environments, the carrier ring 218 may be entirely located within the internal base cavity 226. When present, the base housing 224 may serve to maintain the various components of the lens assembly 100 in position as shown, protect portions of the lens assembly 100 from ambient conditions, facilitate mounting of the entire lens assembly 100 to a substrate or other underlying surface, or could be provided for any other desired reason. The base housing 224 may be assembled with one or more other components of the lens assembly 100, such as the lens barrel 108, by a frictional or interference fit, threadable connection with or without a thread locker substance interposed therebetween, adhesive, welding, one or more separately provided fasteners, any other desired attachment or connection scheme, or any combination thereof.

Figure 6:
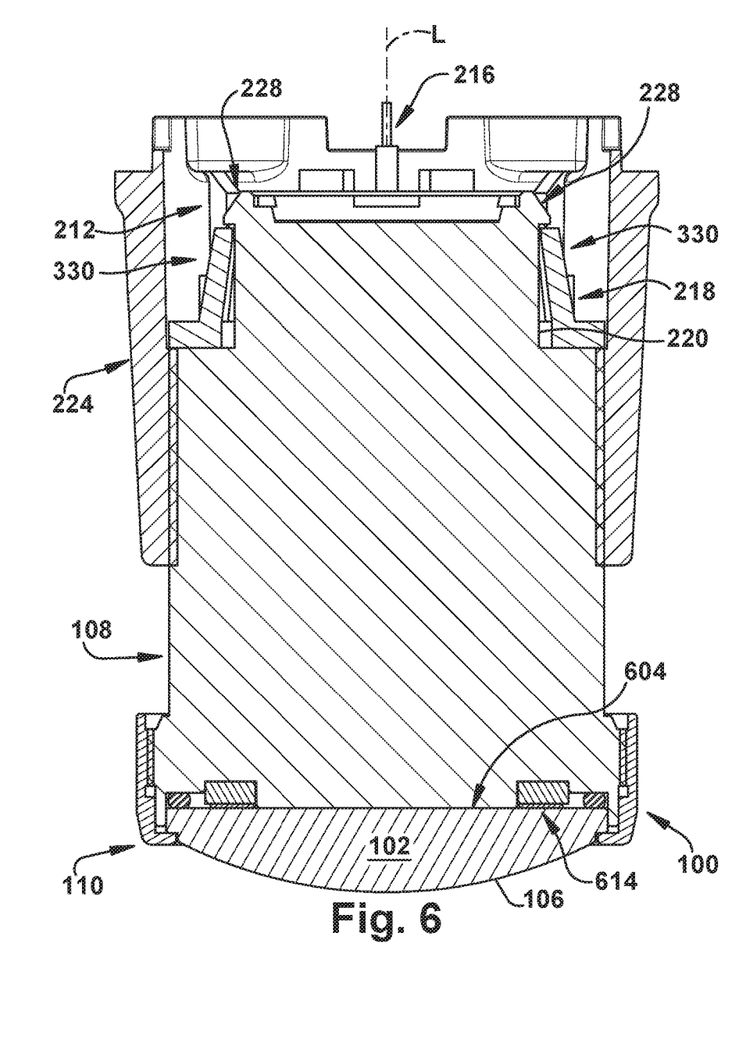
FIG. 6 is a sectional view taken along line 6-6 of FIG. 1.
Figure 7:
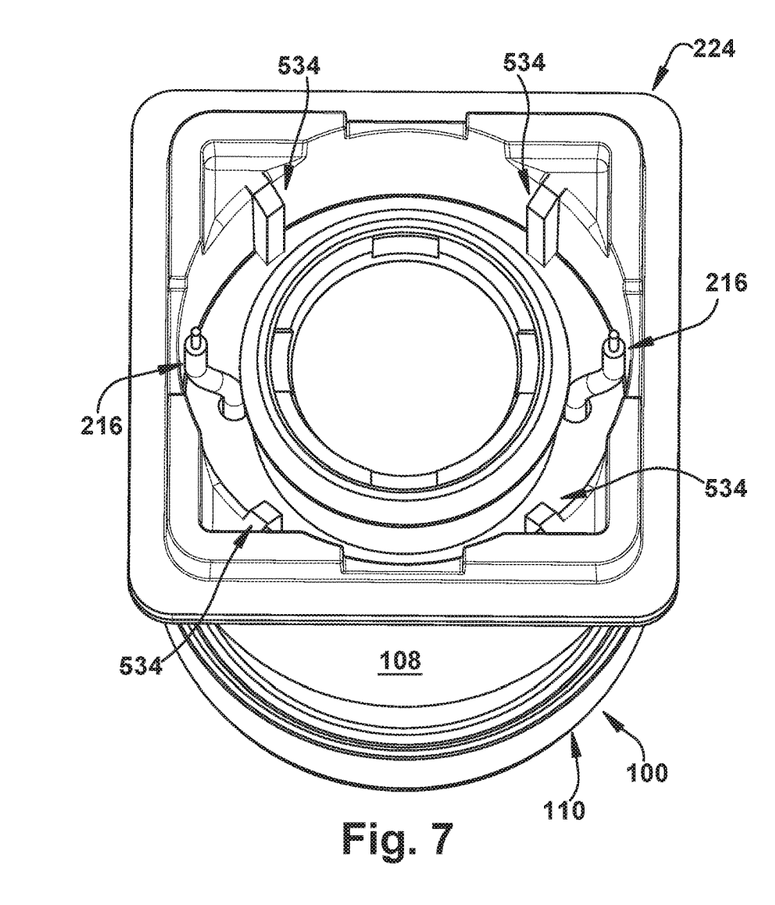
FIG. 7 is a partial perspective bottom view of the assembly of FIG. 1, omitting the component of FIG. 3.

Again as first shown in FIG. 2, the inner lens barrel end 212 may include an overhang feature 228. Optionally, and as shown in FIG. 6, the overhang feature 228 may be wedge-shaped or otherwise configured to facilitate passage of the carrier ring 218 longitudinally thereover in a direction toward the lens 102, but resist "backing out" of the carrier ring 218 from engagement with the lens barrel 108 in a direction away from the lens 102. When provided, the overhang feature 228 may assist with placing the carrier ring 218 in frictional engagement around the outside lens barrel surface 220 in a location longitudinally toward the lens 102 from the overhang feature 228. The term "frictional engagement" is used herein to represent at least one of an interference fit, caused by overlapping dimensional tolerances, and a "snap fit", caused by the temporary expansion of at least a portion of the carrier ring 218 to pass over the overhang feature 228 before contracting to a configuration which then resists removal of the carrier ring 218 from the lens barrel 108. It is contemplated that the frictional engagement may be temporary (e.g., during assembly as in a "snap fit" context) or at least semi-permanent (maintained long-term via use of the lens assembly 100)—both of these situations will be considered herein to be a "frictional engagement".

In support of the "snap fit" type of frictional engagement, at least a portion of the overhang feature 228 may extend outward from the longitudinal axis L past at least a portion of the carrier ring 218. That is, stated differently, at least a portion of the carrier ring 218 may be located closer to the longitudinal axis L then at least a portion of the overhang feature 228 or another selected portion of the outside lens barrel surface 220.

Figure 3:
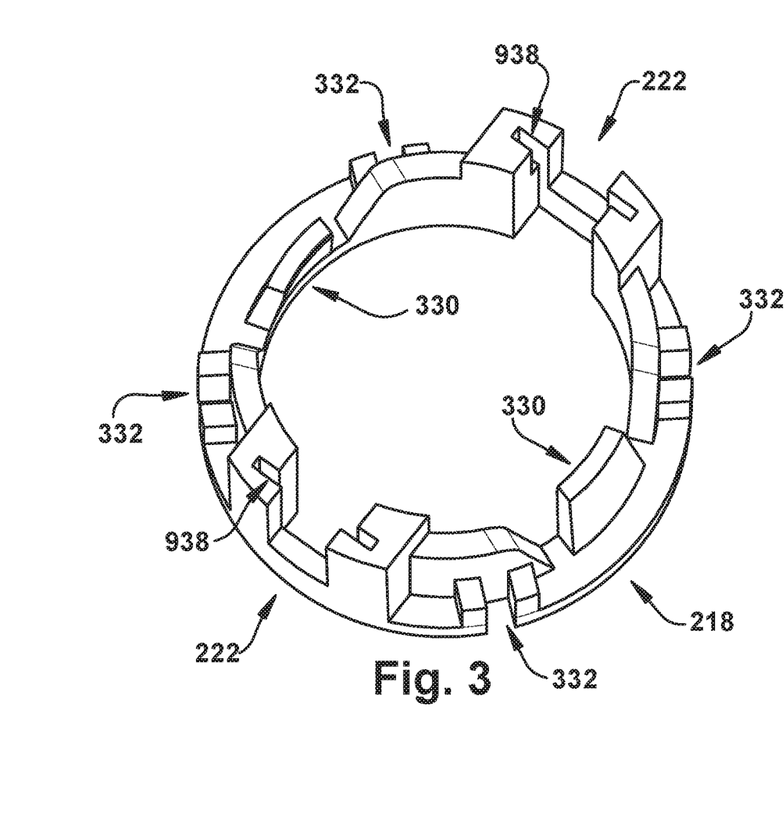
FIG. 3 is a perspective bottom view of a component of the assembly of FIG. 1.
Figure 4:
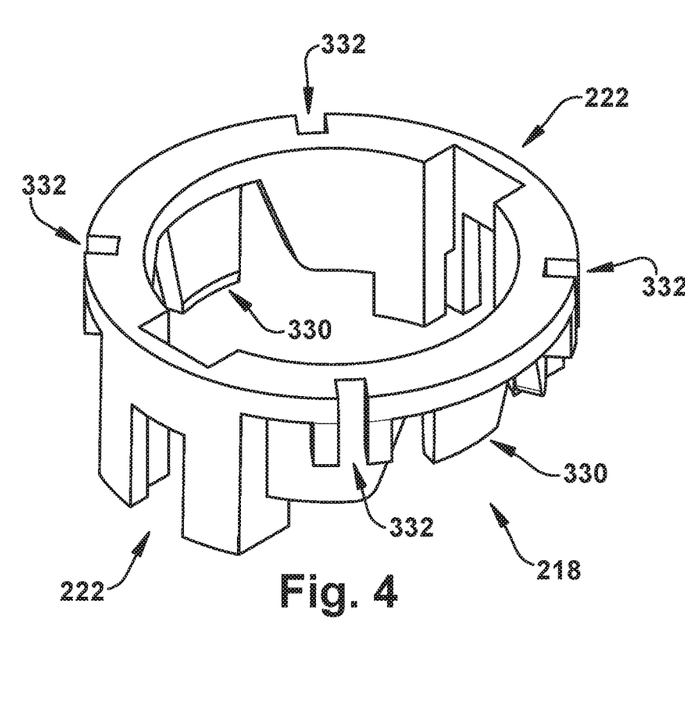
FIG. 4 is a perspective top view of the component of FIG. 3.

With reference now to FIGS. 3-4, the carrier ring 218 may include at least one longitudinally extending carrier tooth 330 configured for selective frictional engagement with the overhang feature 228. Each carrier tooth 330 can be located as desired upon the carrier ring 218 and configured appropriately to selectively "snap" into engagement with the overhang feature 228, or any other desired structure of the lens barrel 108, to prevent removal of the carrier ring 218 from the lens barrel 108 in a direction away from the lens 102. In the configuration of the lens assembly 100 shown in the Figures, the carrier teeth 330 are at least partially or slightly located closer to the longitudinal axis L then is at least a portion of the overhang feature 228.

Figure 5:
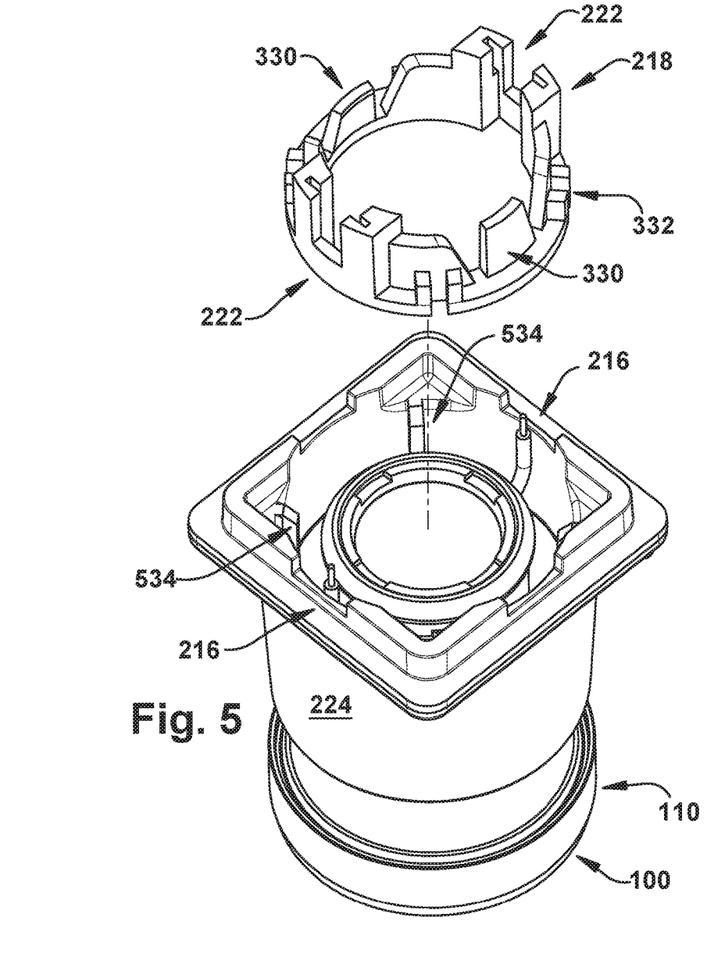
FIG. 5 is a partially exploded bottom perspective view of the assembly of FIG. 1 including the component of FIG. 3.

Again as depicted in FIGS. 3-4, the carrier ring 218 may include at least one carrier locator feature 332 configured for selective engagement with a corresponding cavity locator feature (shown at 534 in FIG. 5) of the internal base cavity 226. When present, the carrier and cavity locator features 332 and 534 may cooperatively at least partially dictate radial orientation of the carrier ring 218 within the base housing 224, when the carrier ring 218 is maintained within the base housing 224 around the lens barrel 108. The depicted carrier and cavity locator features 332 and 534 are slots and rails, respectively, as shown herein, such that the carrier ring 218 is guided to slide into position respective to the base housing 224 during manufacture of lens assembly 100. However, it is contemplated that the slots and rails could be reversed, another interlocking or non-interlocking structure could be provided as a locator feature, or any other mechanical arrangement could be provided to at least partially dictate radial orientation of the carrier ring 218 within the base housing 224, or for any other desired purpose.

As with the lead stations 222 and heater element electrical leads 216, the carrier and cavity locator features 332 and 534 could be provided in differing numbers, orientations, locations on their respective components, or have any other variable design. It is contemplated, for both of these functions, that a carefully selected pattern of suitable structures could be placed upon the components of lens assembly 100 in such a way that different ones are brought into mutual engagement for differently configured heater elements 614, base housings 224, or other structures of the lens assembly 100. For example, one of ordinary skill in the art could design a carrier ring 218 and cooperative structures of the lens assembly 100 to either facilitate or prevent the use of one specific type of carrier ring 218 or base housing 224 sequentially with a variety of different other components of the lens assembly 100. It is contemplated that, in this manner, a single selected design of carrier ring 218, for example, could be used with a plurality of different designs of a base housing 224 for various use environments of lens assembly 100, and thus reduce the number of parts that a manufacturer would need to hold in inventory.

Figure 8:
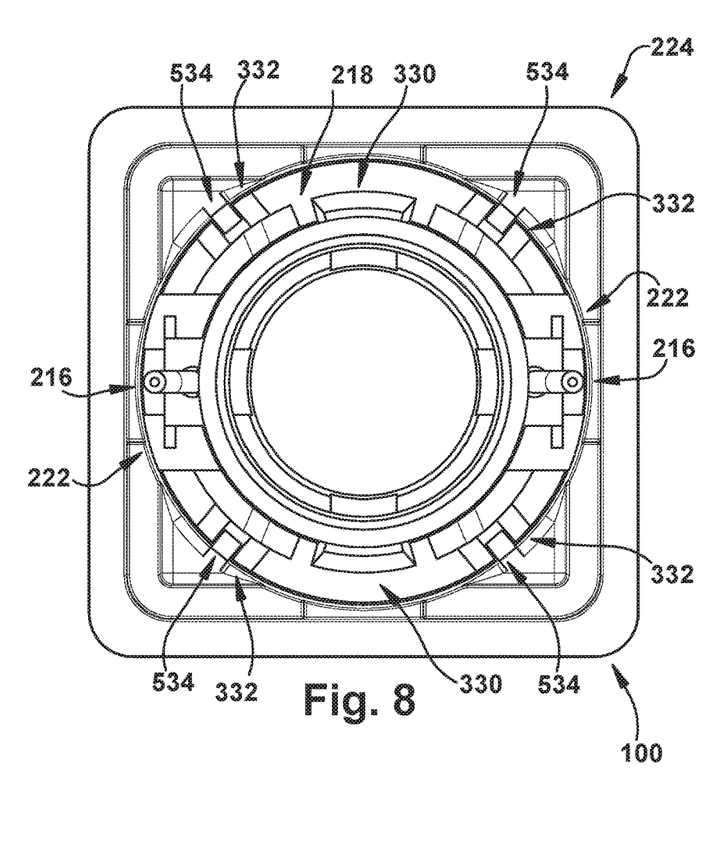
FIG. 8 is a partial bottom view of the assembly of FIG. 1, including the component of FIG. 3.

One of ordinary skill in the art, with reference to at least FIGS. 5-8, will understand how the carrier ring 218 and the various features thereof facilitates the manufacturer of the lens assembly 100, potentially in an at least semi-automated manner. As opposed to prior art lens assemblies, for which the heater element electrical leads need to be carefully threaded through portions of the various other components by hand, a manufacturer of a lens assembly 100 utilizing the carrier ring 218 can, for example, guide the carrier ring 218 into desired radial orientation with respect to the base housing 224. The manufacturer can then "snap" or otherwise frictionally fit the radially aligned carrier ring 218 about the lens barrel 108, such as through use of the overhang feature 228 and carrier teeth 330. It then becomes relatively simple for the manufacturer to have confidence that each heater element electrical lead 216 is positioned within a lead station 222 once the carrier ring 218 is seated into place as desired. This partially-assembled arrangement is shown in FIG. 8.

Figure 9:
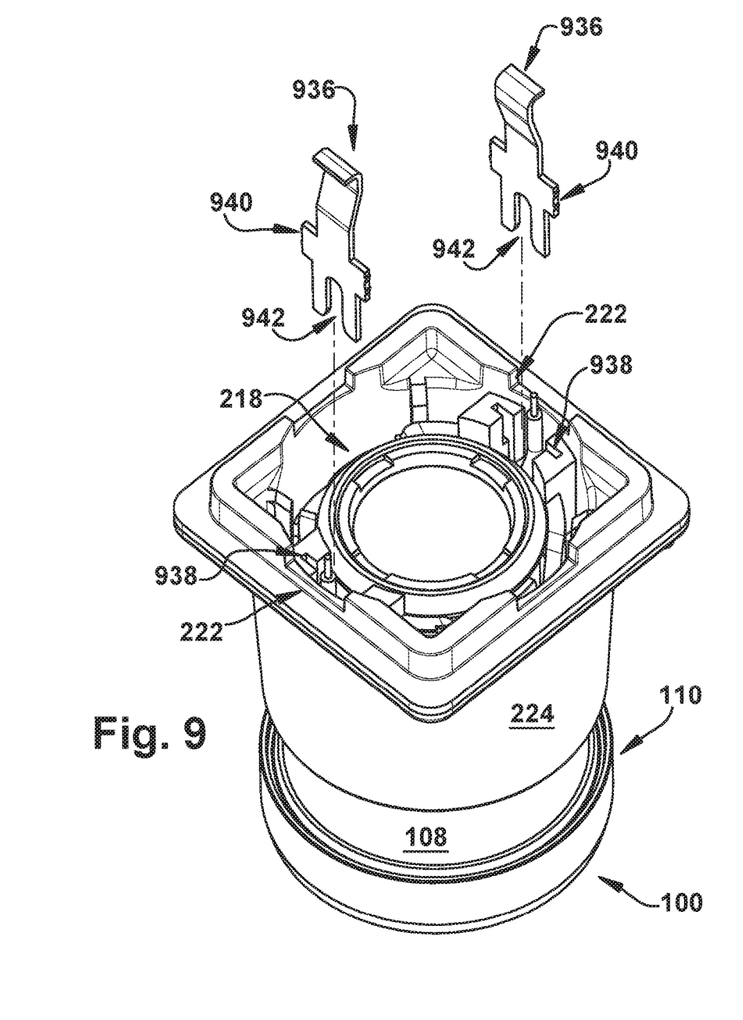
FIG. 9 is a partially exploded bottom perspective view of the assembly of FIG. 1.
Figure 10:
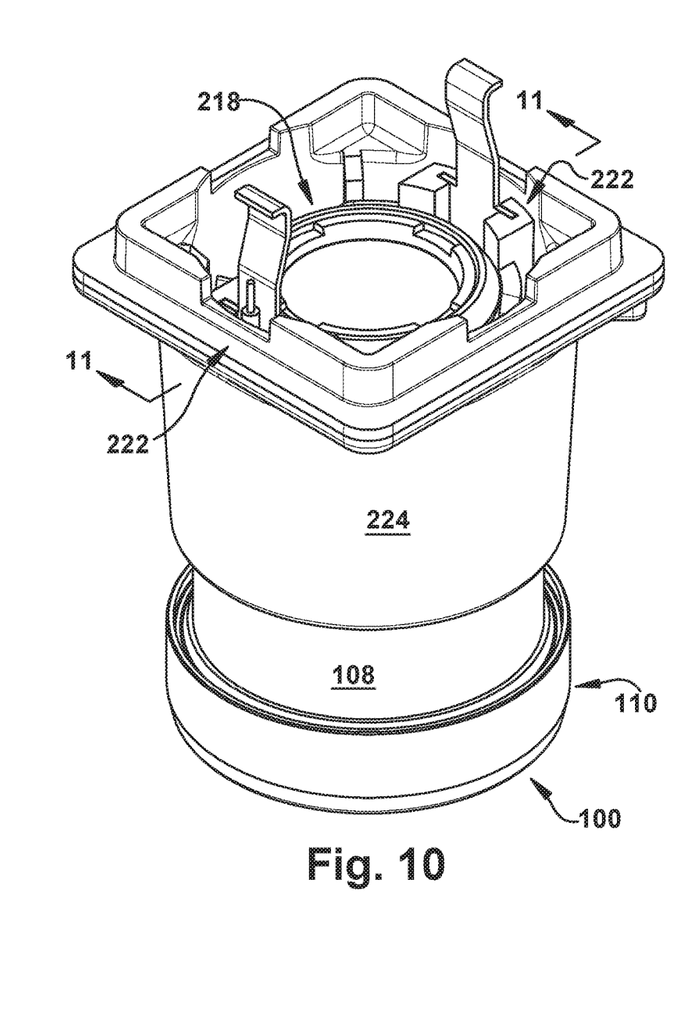
FIG. 10 is a bottom perspective view of the assembly of FIG. 1.

Turning now to FIGS. 9-11, at least one terminal blade 936 may be provided for placing an associated heater element electrical lead 216 into electrical contact with a source of power and/or signal, to facilitate desired operation of the heater element 614 when the lens assembly 100 is in use. The lead stations 222 may each include a terminal slot 938 for selectively maintaining a terminal blade 936 in a longitudinally extending position with respect to the carrier ring 218. This could be facilitated, for example, by longitudinal insertion of the blade ears 940 of the terminal blades 936 into the terminal slot 938.

Once the terminal blade 936 is inserted into the terminal slot 938, a predetermined amount of longitudinal force (downward, in the orientation of FIGS. 9-10) is exerted upon the terminal blade 936, such that the lead slot 942 of each terminal blade 936 "bites" into the insulation around the heater element electrical lead 216 to electrically connect the terminal blade 936 to the heater element electrical lead 216 in a known manner. (It is contemplated that, for most use environments, the longitudinal force and/or physical characteristics of the carrier ring 218 will be calibrated to prevent the terminal blade 936 from severing the heater element electrical lead 216)

Once more, the structure of the carrier ring 218 can be helpful in initiating and maintaining this connection. That is, the lead station 222 of the carrier ring 218 supports the heater element electrical lead 216 in electrical contact with the terminal blade 936, when present. It is contemplated that at least a portion of the terminal blade 936 (e.g., the blade ears 940) may be driven into the material of the terminal slot 938 to maintain the terminal blade 936 in position. It is also contemplated that the terminal blade 936 may be soldered and/or welded to the heater element electrical lead 216, in addition to or instead of the described force-driven "biting" engagement. Again, the presence and design of the carrier ring 218 can be helpful in facilitating predictable and repeatable positioning of the terminal blade 936 and the heater element electrical lead 216, which may assist with automating the manufacture process for the lens assembly 100.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A lens assembly, comprising:
    a lens having an inner surface and an outer surface;
    a lens barrel supporting the lens and having outer and inner lens barrel ends separated by a longitudinal axis, the lens arranged along the longitudinal axis to span the outer lens barrel end such that the inner surface of the lens is within the lens barrel and the outer surface of the lens is outside the lens barrel;
    a heater element longitudinally adjacent to the inner surface of the lens and located within the lens barrel, wherein the heater element has a heater element electrical lead extending radially and longitudinally therefrom to provide power to the heater element; and
    a carrier ring extending circumferentially around at least a portion of an outside lens barrel surface adjacent to the inner lens barrel end, the carrier ring including at least one lead station radially aligned with the heater element electrical lead, the heater element electrical lead extending into the lead station of the carrier ring so as to be engaged by and electrically connected to an electrical component subsequently inserted into the lead station.

2. The lens assembly of claim 1, wherein the heater element electrical lead is at least partially interposed between the lens barrel and the carrier ring.

3. The lens assembly of claim 1, wherein the electrical component is a terminal blade and the lead station includes a terminal slot for selectively maintaining the terminal blade in a longitudinally extending position with respect to the carrier ring.

4. The lens assembly of claim 3, wherein the lead station supports the heater element electrical lead in electrical contact with the terminal blade, when present.

5. The lens assembly of claim 1, wherein the lens and the lens barrel have a modular assembly arrangement including the heater element.

6. The lens assembly of claim 1, wherein the heater element extends circumferentially about the longitudinal axis.

7. The lens assembly of claim 1, wherein the inner lens barrel end includes an overhang feature, and the carrier ring is in frictional engagement around the outside lens barrel surface longitudinally toward the lens from the overhang feature.

8. The lens assembly of claim 7, wherein at least a portion of the overhang feature extends outward from the longitudinal axis past at least a portion of the carrier ring.

9. The lens assembly of claim 7, wherein the carrier ring includes a longitudinally extending carrier tooth configured for selective frictional engagement with the overhang feature.

10. The lens assembly of claim 1, including a base housing having an internal base cavity concurrently circumferentially surrounding at least a portion of the carrier ring and at least a portion of the outside lens barrel surface.

11. The lens assembly of claim 10, wherein the carrier ring is entirely located within the internal base cavity.

12. The lens assembly of claim 10, wherein the carrier ring includes at least one carrier locator feature configured for selective engagement with a corresponding cavity locator feature of the internal base cavity to at least partially dictate radial orientation of the carrier ring within the base housing when the carrier ring is maintained therein around the lens barrel.

13. The lens assembly of claim 3, wherein the lead station includes a radially extending lead opening into which a portion of the heater element electrical lead radially extends, the terminal slot extending longitudinally so that the terminal blade, when longitudinally inserted into the terminal slot, intersects the lead opening.

14. The lens assembly of claim 1, wherein the electrical component is a terminal blade, the terminal blade cutting longitudinally into a portion of the heater element electrical lead in the lead station to electrically connect the terminal blade to the heater element electrical lead.

15. The lens assembly of claim 1, wherein the carrier ring is snap-fitted onto the lens barrel.

16. A lens assembly, comprising:

a lens having an inner surface and an outer surface;

a lens barrel supporting the lens and having outer and inner lens barrel ends separated by a longitudinal axis, the lens arranged along the longitudinal axis to span the outer lens barrel end such that the inner surface of the lens is within the lens barrel and the outer surface of the lens is outside the lens barrel;

a heater element longitudinally adjacent to the inner surface of the lens and located within the lens barrel, wherein the heater element has a heater element electrical lead extending therefrom to provide power to the heater element;

a carrier ring extending circumferentially around at least a portion of an outside lens barrel surface adjacent to the inner lens barrel end, the carrier ring including at least one lead station radially aligned with the heater element electrical lead; and a base housing having opposite first and second openings, an inner surface of the base housing longitudinally extending between the first and second openings and defining an internal base cavity of the base housing, at least a portion of the carrier ring and at least a portion of the outside lens barrel surface being circumferentially surrounded by inner surface of the base housing in the internal base cavity.

17. The lens assembly of claim 16, wherein the lens barrel is connected to the inner surface of the base housing.

18. The lens assembly of claim 16, wherein the carrier ring is entirely located within the internal base cavity.

19. The lens assembly of claim 16, wherein one of the carrier ring and the inner surface of the housing includes a rail and the other of the carrier ring and the inner surface includes a slot for receiving the rail.

* * * * *